April 4, 1961 E. C. BECKMAN 2,977,785
DECK LID LATCH
Filed Dec. 16, 1957 2 Sheets-Sheet 1
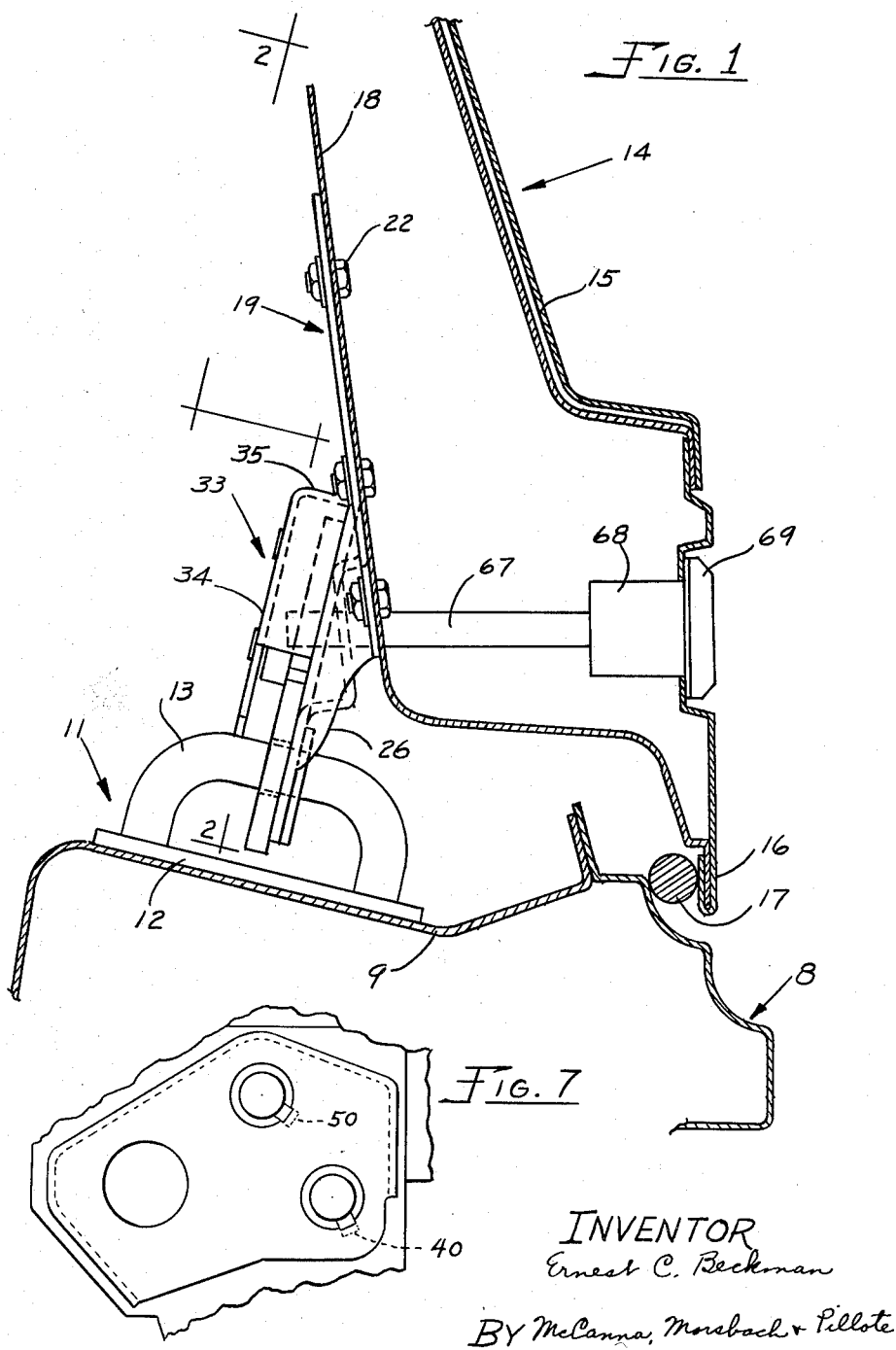
INVENTOR
Ernest C. Beckman
BY McCanna, Morsbach & Pillote
ATT'YS.

April 4, 1961  E. C. BECKMAN  2,977,785
DECK LID LATCH
Filed Dec. 16, 1957  2 Sheets-Sheet 2
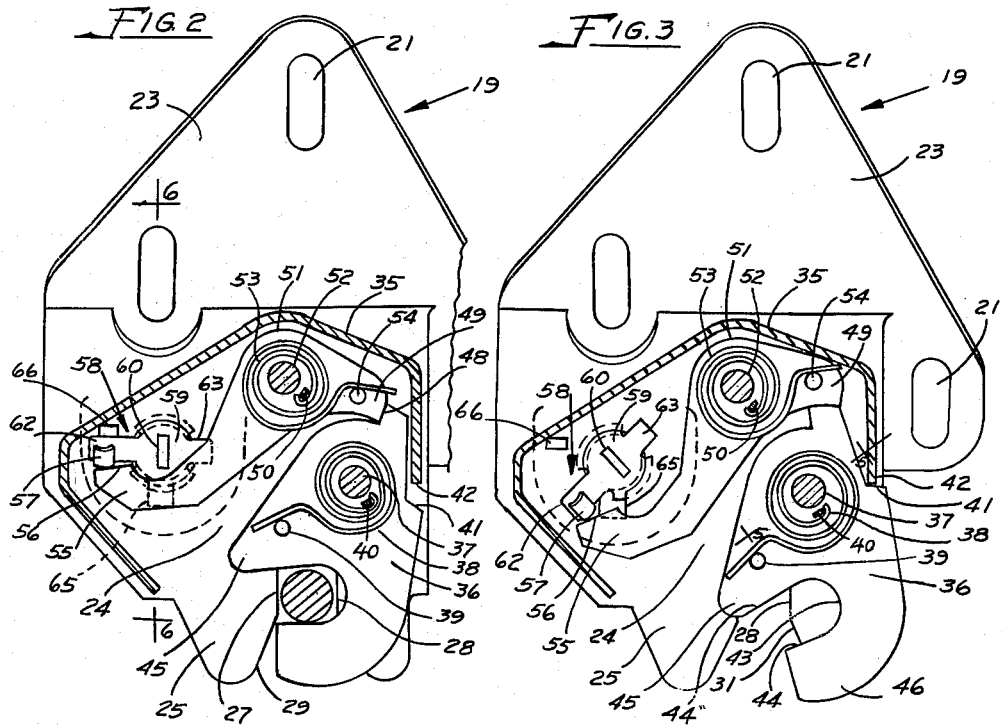
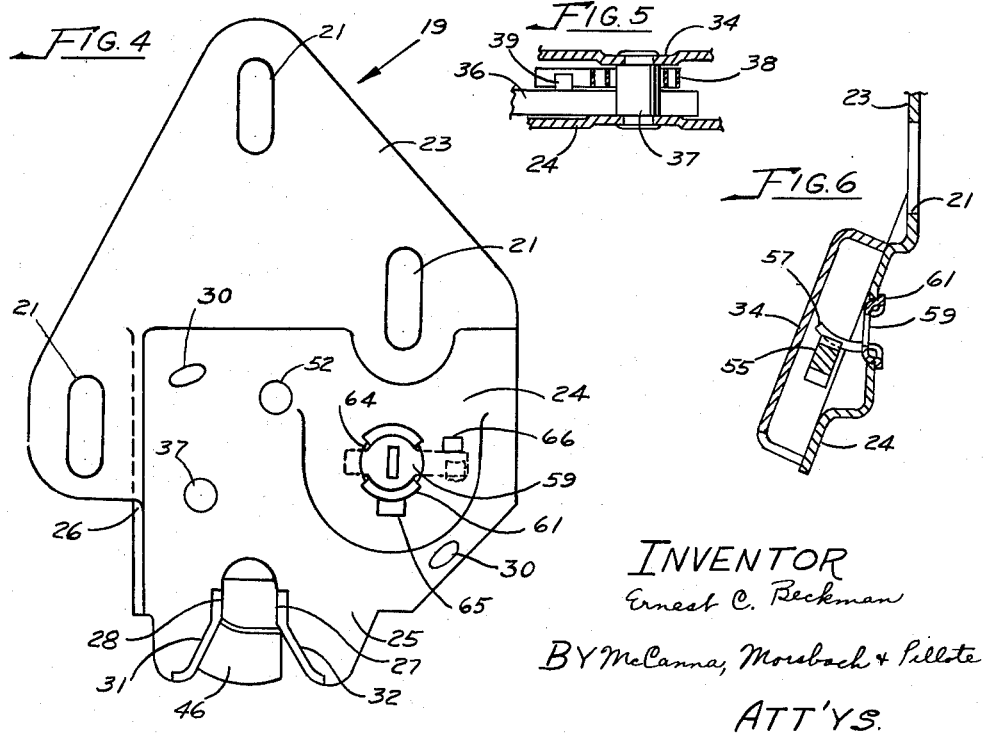
INVENTOR
Ernest C. Beckman
BY McCanna, Morsbach & Pillote
ATT'YS.

United States Patent Office 2,977,785
Patented Apr. 4, 1961

2,977,785

DECK LID LATCH

Ernest C. Beckman, Rockford, Ill., assignor to Modern Metal Products Co., Loves Park, Ill., a corporation of Illinois Filed Dec. 16, 1957, Ser. No. 703,119

5 Claims. (Cl. 70—141)

This invention relates to a latch intended primarily for latching the deck lid of an automobile in closed position.

The important objects of the invention are the provision of a latch of the type described which is of small volume, is thin in cross-section so that it will project a minimum distance into the luggage compartment, wherein the parts are sturdy so as to withstand rough usage and the shocks occasioned by repeated closing of the lid and in which all of the parts may be formed of metal stampings to minimize the cost of production yet provide maximum strength and trouble free operation.

Other objects and advantages will appear from the following description and the accompanying drawings in which:

Figure 1 is a partial section through the deck lid and adjacent body portions of an automobile showing the latch structure, Fig. 2 is a view partly in section, on the line 2—2 of Fig. 1 showing the parts in latched position, Fig. 3 is a view similar to Fig. 2 showing the parts in open or unlatched position, Fig. 4 is an elevational view of the opposite side of the plate from that shown in Fig. 2, Fig. 5 is a section on the line 5—5 of Fig. 3, Fig. 6 is a section on the line 6—6 of Fig. 2, and Fig. 7 is a fragmentary side elevational view showing the cover.

In Fig. 1 of the drawings the latch is shown as attached to an automobile, wherein the numeral 8 indicates a rear element of an automobile body to which is attached a transverse plate 9 to which is secured a keeper 11, in the illustrated embodiment, comprising a base 12 fixed to the plate and an inverted U-shaped bar 13 having its ends fixed in the plate and its intermediate portion spaced from the plate.

The numeral 14 indicates a conventional deck lid element which may have an outer face member 15 extending downwardly to a lip 16 overlapping the body element 8, a rubber seal 17, commonly being disposed therebetween. The lid is hinged to the body on a transverse axis so that the lip 16 swings upwardly and outwardly away from the element 8 in opening the luggage compartment beneath the lid in the usual fashion. An inner liner member 18, spaced inwardly of the face member 15, commonly forms a part of the lid for reenforcing and mounting purposes.

The latch member includes a latch plate indicated generally by the numeral 19 having openings 21 therein for affixing the plate to the liner member 18 of the lid with one side abutting the lid and the other side open or free of body obstructions, as by bolts 22, the openings being elongated for adjustment of the position of the latch plate with respect to the keeper in accordance with the usual practice.

The latch plate is preferably made of stamped and formed steel plate to provide maximum strength and uniformity in shape at minimum manufacturing cost and comprises an attachment portion indicated at 23 having the openings 21, the plate being formed in the particular embodiment illustrated, with an offset area providing an intermediate mounting portion 24 and a keeper engaging portion 25. A rib 26 interconnects the attachment portion and the offset area to lend support to the offset area when, because of the inclination of the inner member 18 of the lid, it is necessary to provide such an offset in the latch plate.

The lower edge of the keeper engaging portion 25 is provided with a keeper receiving slot having spaced substantially parallelly disposed side walls 27 and 28 spaced a distance slightly greater than the maximum width of the keeper for reception of the keeper therebetween within the slot. The slot also has outwardly diverging walls 29 and 31 for guiding the keeper to the inner section as the keeper moves into the slot. The metal of the plate is preferably flanged along the edges of the slot as indicated at 31 and 32 (Fig. 4) in order to increase the bearing area between the keeper and the plate.

A cover 33 overlies a portion of the intermediate plate portion and comprises a top 34 and side walls 35 formed around a portion of its perimeter the side walls being staked to the plate by means of tabs extending from the edge of the side walls through the plate and welded as indicated at 36 (Fig. 4). A latch member 36 is pivotally mounted on a pin 37 spanning the space between the top 34 and the plate. The latch member comprises a flat stamped piece of steel plate and is mounted in face to face relation with the intermediate portion of the latch plate as will be apparent from Fig. 5. The latch member is rotatable in a plane parallel to the plane of the adjacent portions of the latch plate between a latched position shown in Fig. 2 and an unlatched or open position as shown in Fig. 3. The latch member is normally urged to the open position of Fig. 3 by a coiled spring 38 having one end hooked behind a lug 40 sheared from the top 34 and bent inwardly as will be apparent from Fig. 7 and its opposite end bearing against a pin 39 on the latch member. The latch member has a shoulder 41 positioned to engage against one edge 42 of the cover to limit rotation of the latch member in a counterclockwise direction about the mounting pin 37 and thereby define the open position of the latch member. The latch member has a lower latch section provided with a recess 43 defined by side walls 44 spaced a distance slightly greater than the maximum cross-section of the keeper, the recess forming two nose portions indicated by the numerals 45 and 46. The latch member is mounted so that the latch section overlies the keeper engaging portion of the latch plate with the recess 43 overlying the slot in the keeper engaging portion of the plate as will be apparent from Figs. 2 and 3.

In the open position of the lid the latch member occupies the position shown in Fig. 3 wherein the nose portion 45 extends at an angle across the slot of the plate and the nose portion 46 is retracted so as to not obstruct the entrance of the keeper into the slot. As the deck lid is lowered the keeper enters the inner section of the slot and in the course of this movement engages against the wall 44 of the nose 45 thereby rotating the latch member from the position shown in Fig. 3 to that shown in Fig. 2 whereupon the nose portion 46 moves in a counterclockwise direction to the position shown therein, disposed crosswise of the slot in the keeper engaging portion and acts to confine the keeper within the slot. As the latch member moves to the latched position shown in Fig. 2 a shoulder 48 on the periphery thereof moves past the end 49 of a detent 51 which drops behind the shoulder to retain the latch member in the latched position against the action of the spring 38 and any force which may be exerted between the keeper and the latch member tending to move the latch member to its open position.

The detent 51 comprises a flat metal stamping mounted intermediate its ends on a pin 52 in coplanar relation to the latch member 36, the pin 52 having its ends mounted in the latch plate and the cover in the manner shown in Fig. 5. A coiled spring 53 has one end hooked back of a lug 50 sheared from the top 34 and bent inwardly, the opposite end of the spring bearing against a pin 54 in the detent, the spring acting to urge the detent in a clockwise direction so that the detent arm 49 normally rides the perimeter of the latch member. The detent 51 also has an actuating arm extending from the pin 52 in a somewhat opposite direction from that of the detent arm 49, the upper face of the actuating arm having a bearing surface 56 adapted for engagement by a finger 57 on a rotatable latch release member 58.

The release member 58 comprises a cup shaped portion having a central area 59 and annular segmental side walls terminating in outwardly disposed flanges 61 disposed in a plane spaced from the central area 59. Projections 62 and 63 extend outwardly from opposite sides of the central area 59 disposed in the same plane as this area, the projection 62 carrying the finger 57. The latch plate has a circular opening 64 for the reception of the cup-shaped portion of the member and serves to support the member for rotation by contact with the annular walls thereof. In assembling the release member to the latch plate, the release member is oriented for the passage of the projection 62 and finger 57 through the opening 64 from the back of the plate, whereupon the release member is turned to swing the projection 63 through a notch 65 at one edge of the opening 64 whereby the central area 59 and the projections 62 and 63 are disposed on one side of the plate whereas the elements 61 are disposed on the opposite side of the plate. Thereafter the release member is rotated in a clockwise direction facing Fig. 2 through approximately 270° to the position shown in Fig. 2 and until the projection 62 strikes an abutment 66 which limits this rotation. It will be seen that when the detent 51 is assembled on the plate the actuating arm 55 prevents rotation of the release member in a counterclockwise direction to a degree sufficient to release it from the plate. The central area 59 has a rectangular opening 60 for the reception of a rod 67 extending to a cylinder lock 68 mounted in the lid and having a portion 69 thereof exposed on the exterior of the lid for the reception of a key for releasing the latch in the usual manner.

When the deck lid is in closed or latched position as shown in Fig. 1, insertion of the proper key in the cylinder lock 68 and rotation thereof rotates the rod 67 which in turn acts to turn the release member 58 in a counterclockwise direction facing Fig. 1. This causes the finger 57 to depress the actuating arm 55 and rotate the detent 51 to the position shown in Fig. 3. This releases the latch member 36 for rotation to the position shown in Fig. 3. Such rotation is brought about by two forces one being the coiled spring 38 which normally urges the latch member to this position. However, when the deck lid is in closed position the gasket 17 is normally somewhat compressed and consequently when the latch member is released the keeper moves downwardly with respect to the slot in the latch plate to a position such as to enable the spring 38 to rotate the latch member until the shoulder 41 engages the stop 42 as shown in Fig. 3 thus completely releasing the keeper from the latch member and positioning the latch member for reclosing operation. In order to remove the key from the cylinder 68 it becomes necessary to rotate the cylinder or key back to its original position thereby returning the release member 58 to the position shown in Fig. 2 and allowing the detent to rotate under the force of its spring back into engaging position against the latch member.

It will be observed that the latch member 36, the detent 51 and the release member 58 all lie in the same plane and pivot on parallel axis so that the latch is of thin cross-sectional area and occupies a minimum of space in the luggage compartment. The parts are all supported on a single plate and the parallel face of a housing member arranged in closely spaced relation, to give maximum strength to the latch structure. Furthermore the structure is such that the plate, the latch member, the detent, the latch release and the cover may all be made of stamped and formed steel plate for maximum strength and minimum cost and weight.

I claim:

1. A latch mechanism for releasably latching a hinged deck lid element to a body element comprising in combination a keeper bar arranged for mounting on said body element, a plate of stamped and formed sheet metal having an open side and an abutment side comprising an attachment portion shaped for attachment to said deck lid opposite the keeper with said abutment side against said deck lid, an intermediate mounting portion, and a keeper engaging portion at the opposite side of the intermediate portion from the attachment portion and in coplanar relationship therewith projecting downwardly from the deck lid when mounted in operative position and having spaced walls defining a keeper receiving slot extending inwardly from the edge of the plate, said walls defining an inner section having approximately parallel spaced sides for the reception of the keeper therebetween and a section having flanged, outwardly diverging sides for guiding the keeper to the inner section, a flat latch member pivotally mounted on the intermediate portion in parallel face-to-face relation with the open side of the plate rotatable between a latched and open position, a latch spring at the open side of the plate urging the latch member to an open position, stop means fixed with respect to the latch member operative on the latch member for limiting rotation of the latch member at the open position, said latch member having a latch portion overlying said keeper engaging portion, the latch portion having spaced recess walls defining a recess in an edge thereof, one of the recess walls being disposed across the keeper receiving slot in the path of the keeper entering the slot for rotation of the latch member to latch position against the force of the spring in response to movement of the keeper into the keeper receiving slot, the opposite recess wall being positioned to move across the keeper receiving slot behind the keeper as the latch member moves to latched position, to confine the keeper within the keeper receiving slot, a flat detent pivotally mounted intermediate its ends on said mounting portion in coplanar relation to the latch member having a detent arm positioned to engage the perimeter of the latch member and an actuating arm, a second spring means on the open side of the plate for biasing the detent arm against the latch member, stop means on the latch member engageable by the detent arm to retain the latch member in latched position against the force of the latch spring, and a latch release member mounted on the mounting portion of the plate for rotation thereon having a lock receiving portion for rotation thereof and a finger positioned for engagement with said actuating arm to rotate the detent and release the latch member for rotation to its open position.

2. The combination of claim 1 including a cover overlying said latch member, said detent, said latch spring, said detent spring and said latch release, said cover having side walls staked to said plate and a top disposed in spaced relation thereto, pivot pins supporting said latch member and said detent between said plate and said top, the pivot pins having their ends mounted in said plate and said cover and lugs sheared from said cover and bent inwardly for retaining an end of the latch spring and the detent spring.

3. The combination of claim 1 wherein the plate has a circular opening with a laterally projecting notch and the latch release member includes a cup-shaped part having a central area and annular walls shaped for bearing reception in said circular opening and terminating in outwardly turned flanges adapted to bear against one side of the plate, a pair of diametrically opposed projections extending outwardly in the plane of the central area, one of said projections carrying the aforesaid finger, the other of said projections being shaped to pass through said notch upon insertion of the finger projection and the centrtal area through the circular opening to bear against the opposite side of the plate when the latch release member is rotated about the axis of the cup-shaped part to retain the latch release member on the plate and a latch release stop in spaced relation from the actuating arm, for reception of the finger and finger projection therebetween when the parts occupy the latched position, said notch being located at substantially 90° with respect to the finger projection when the same occupies the latched position.

4. The combination recited in claim 1 wherein said intermediate mounting portion and said keeper engaging portion of the plate lie in the coplanar relationship disposed at an angle with respect to the attachment portion and diverge from the plane of the abutment side beyond the plane of the open side of the plate.

5. A latch mechanism for releasably latching a hinged deck lid element to a body element comprising in combination a keeper bar arranged for mounting on the body element, a plate of stamped and formed sheet metal having an open side and an abutment side comprising an attachment portion shaped for attachment to the deck lid opposite the keeper with said abutment side against the deck lid, an intermediate mounting portion and a keeper engaging portion at the opposite side of the intermediate portion from the attachment portion and in coplanar relationship therewith, projecting downwardly from the deck lid when mounted in operative position and having spaced walls defining a keeper receiving slot extending inwardly from the edge of the plate, said walls defining an inner section having approximately parallel spaced sides for the reception of the keeper therebetween and a section having flanged, outwardly diverging sides for guiding the keeper to the inner section, a cover affixed to the open side of said plate having a face spaced from the intermediate portion of the plate, a pivot pin having its ends mounted in said plate and said face and spanning the space therebetween, a flat latch member on said pin in parallel closely spaced face-to-face relation to the plate rotatable between a latched and an open position, a coiled latch spring disposed around the pivot pin between said face and the latch member having an end secured to the cover operative to urge the latch member to open position, said latch member having a part overlying said slot in the open position of the latch member in the path of the keeper positioned with respect to the pivot pin to rotate the latch member to closed position upon entry of the keeper to the inner section of the slot, said latch member also including a part positioned to move across the slot behind the keeper as the latch member moves to latched position, a detent pivot pin having its ends mounted in said plate and said face, spanning the space therebetween, a flat detent carried intermediate its ends on the detent pin in coplanar relation to the latch member having a detent arm positioned to engage the perimeter of the latch member and having an actuating arm, a coiled detent spring disposed around the detent pivot pin between said face and the detent having one end secured to the cover operative to urge the detent arm against the latch member, means on the perimeter of the latch member engageable by the detent arm in the latched position of the latch member to retain the same in latched position against the force of the latch spring and the load applied thereto by the keeper and a latch release mounted on the plate and arranged for manual rotation to unlatch the deck lid, said release having a finger positioned for engagement with said actuating arm to rotate the detent and thereby permit rotation of the latch member to its open position.

References Cited in the file of this patent

UNITED STATES PATENTS

| | | |
|---|---|---|
| 770,542 | Slaymaker | Sept. 20, 1904 |
| 2,454,920 | Heineman | Nov. 30, 1948 |
| 2,508,090 | Beems et al. | May 16, 1950 |
| 2,795,947 | Peras | June 18, 1951 |
| 2,806,727 | Johnstone | Sept. 17, 1957 |

FOREIGN PATENTS

| | | |
|---|---|---|
| 161,710 | Australia | Mar. 4, 1955 |
| 200,297 | Australia | Nov. 30, 1955 |
| 610,696 | Great Britain | Oct. 19, 1948 |
| 630,768 | Great Britain | Oct. 20, 1949 |